(12) United States Patent
Tirgovet

(10) Patent No.: US 9,863,422 B2
(45) Date of Patent: Jan. 9, 2018

(54) VACUUM PUMP OUTLET VALVE

(71) Applicant: Magna Powertrain Bad Homburg GmbH, Bad Homburg (DE)

(72) Inventor: Iustin Tirgovet, Solingen (DE)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 0 days.

(21) Appl. No.: 15/103,919

(22) PCT Filed: Nov. 5, 2014

(86) PCT No.: PCT/EP2014/073817
§ 371 (c)(1),
(2) Date: Jun. 13, 2016

(87) PCT Pub. No.: WO2015/090715
PCT Pub. Date: Jun. 25, 2015

(65) Prior Publication Data
US 2016/0312783 A1 Oct. 27, 2016

(30) Foreign Application Priority Data
Dec. 17, 2013 (DE) .................. 10 2013 114 191

(51) Int. Cl.
*F04C 29/12* (2006.01)
*F16K 15/16* (2006.01)
(Continued)

(52) U.S. Cl.
CPC ............ *F04C 29/128* (2013.01); *F04C 18/34* (2013.01); *F04C 18/344* (2013.01); *F16K 15/16* (2013.01);
(Continued)

(58) Field of Classification Search
CPC ................. F16K 15/16; F04C 29/128
(Continued)

(56) References Cited

U.S. PATENT DOCUMENTS

| 4,628,963 A | 12/1986 | Ishijima et al. | |
| 6,766,823 B2* | 7/2004 | Hong | F04B 39/1073 137/514 |
| 7,789,634 B2* | 9/2010 | Higashi et al. | F04B 39/1073 137/856 |

FOREIGN PATENT DOCUMENTS

| CN | 1892025 A | 1/2007 |
| DE | 3508182 A1 | 9/1985 |

(Continued)

OTHER PUBLICATIONS

International Search Report and Written Opinion dated Jan. 26, 2015 from International Patent Application No. PCT/EP2014/073817 (with English Translation of International Search Report).

(Continued)

*Primary Examiner* — Kevin Lee
(74) *Attorney, Agent, or Firm* — Dickinson Wright PLLC

(57) ABSTRACT

The invention concerns an outlet valve, in particular of a vacuum pump, with a main valve spring which, in a closed state of the outlet valve, closes at least one outlet opening from which the main valve spring lifts off on opening of the outlet valve, and with a hold-down element which forms a stop for the main valve spring on opening, wherein at least one additional valve spring is arranged between the main valve spring and the hold-down element. The invention is distinguished in that in closed state of the outlet valve, the additional valve spring is partly spaced from the main valve spring in the opening direction, in particular spaced with a free end from a free end of the main valve spring.

17 Claims, 1 Drawing Sheet

(51) Int. Cl.
F04C 18/34 (2006.01)
F04C 18/344 (2006.01)
(52) U.S. Cl.
CPC ...... *F04C 2220/10* (2013.01); *F04C 2240/30* (2013.01)
(58) Field of Classification Search
USPC .................................. 137/856, 855
See application file for complete search history.

(56) References Cited

FOREIGN PATENT DOCUMENTS

| | | |
|---|---|---|
| JP | H11294337 A | 10/1999 |
| WO | WO2009018906 A1 | 2/2009 |
| WO | WO2010145633 A2 | 12/2010 |

OTHER PUBLICATIONS

Search Report dated Feb. 15, 2017 from corresponding Chinese Patent Application No. 2014800687604.

\* cited by examiner

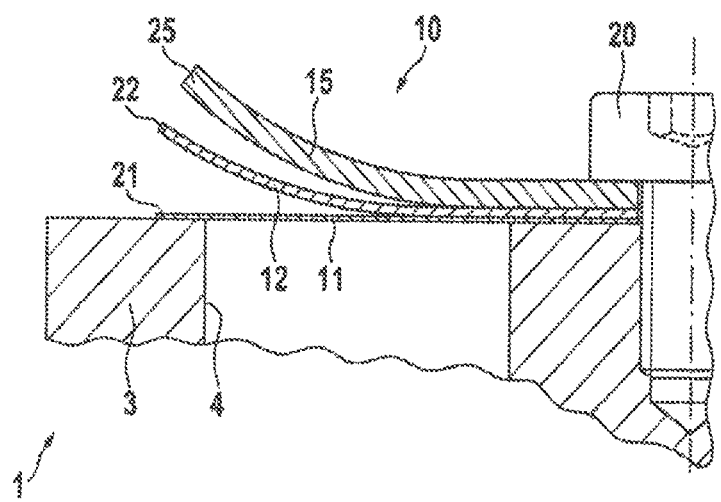

VACUUM PUMP OUTLET VALVE

CROSS-REFERENCE TO RELATED APPLICATIONS

This application is a U.S. National Stage of International Application No. PCT/EP2014/073817, filed Nov. 5, 2014 and which claims priority to German Application No. DE 10 2013 114 191.9 filed Dec. 17, 2013. The entire disclosure of each of the above listed applications is incorporated herein by reference.

FIELD

The invention concerns an outlet valve, in particular of a vacuum pump, with a main valve spring which, in a closed state of the outlet valve, closes at least one outlet opening from which the main valve spring lifts off on opening of the outlet valve, and with a hold-down element which forms a stop for the main valve spring on opening, wherein at least one additional valve spring is arranged between the main valve spring and the hold-down element.

International publication WO 2009/018906 A1 describes a vacuum pump with a check valve which is configured as a spring valve and comprises a main flat leaf spring which covers both a main outlet cross-section and also an additional outlet cross-section, and an additional flat leaf spring which only covers the additional outlet cross-section. International publication WO 2010/145633 A2 discloses a vacuum pump which comprises an outlet valve with at least one metal part which has at least one plastic layer to improve the sealing and/or damping properties, wherein the metal part is a valve spring which in a closed state closes at least one outlet opening from which it lifts off on opening.

DE3508182 describes a leaf spring with a main leaf and a shorter additional leaf. The additional spring influences the resonance behavior of the spring valve. However, the problem of pressure pulsations cannot be satisfactorily solved with this.

SUMMARY

The object of the invention is to improve the operating behavior of an outlet valve with a main valve spring which, in a closed state of the outlet valve, closes at least one outlet opening from which the main valve spring lifts off on opening of the outlet valve, and with a hold-down element which forms a stop for the main valve spring on opening, wherein at least one additional valve spring is arranged between the main valve spring and the hold-down element.

This object is achieved in an outlet valve, in particular of a vacuum pump, with a main valve spring which, in a closed state of the outlet valve, closes at least one outlet opening from which the main valve spring lifts off on opening of the outlet valve, and with a hold-down element which forms a stop for the main valve spring on opening, wherein at least one additional valve spring is arranged between the main valve spring and the hold-down element, in that in closed state of the outlet valve, the additional valve spring is partly spaced from the main valve spring in the opening direction, in particular spaced with a free end from a free end of the main valve spring. In closed state of the outlet valve, the additional valve spring does not lie completely against the main valve spring. Thus in a simple manner, it is achieved that the main valve spring can at first open independently of the additional valve spring. Only when the main valve spring is partly opened does the main valve spring come to rest on the additional valve spring. On further opening, the main valve spring and the additional valve spring move together up to the hold-down element. In this common opening of the main valve spring and additional valve spring, the additional valve spring constitutes a resistance to the opening of the main valve spring. Due to the arrangement of the additional valve spring according to the invention between the main valve spring and the hold-down element, particularly advantageously a progressive spring characteristic curve of the outlet valve can be created. The outlet valve may also be called a check valve because in closed state of the outlet valve, the main valve spring automatically closes the outlet opening as long as no positive pressure is present at the outlet opening. The outlet valve has an additional valve spring which has a greater thickness than the main valve spring and the same length as far as the free ends, in order to achieve the progressive characteristic curve.

For example, the additional valve spring has a thickness of 0.5 to 0.8 millimeters. This thickness range has proved particularly advantageous in experiments performed in the context of the present invention.

A preferred exemplary embodiment of the outlet valve is characterized in that in the closed state of the outlet valve, the additional valve spring is spaced with a free end from a free end of the hold-down element. This achieves in a simple manner that the main valve spring and the additional valve spring can move together up to the hold-down element when the outlet valve is opened.

A further preferred exemplary embodiment of the outlet valve is characterized in that the main valve spring, the additional valve spring and the hold-down element are firmly clamped together with their ends remote from the free ends. In this way, installation of the outlet valve according to the invention is substantially simplified. The main valve spring, the additional valve spring and the hold-down element may be fixed over the outlet opening on a pump housing for example with a fixing element such as a fixing screw.

A further preferred exemplary embodiment of the outlet valve is characterized in that the outlet valve with the main valve spring and the additional valve spring has a progressive spring characteristic curve. Progressive means that the spring characteristic curve does not rise linearly but has increasingly rising, or ever further rising, or an exponentially increasing curve. Due to the progressive spring characteristic curve, the operating behavior of the outlet valve, in particular in special operating states of a vacuum pump equipped with the outlet valve, can be significantly improved. Particularly advantageously, the service life of the outlet valve, in particular of a vacuum pump equipped with the outlet valve, can easily be extended.

A further preferred exemplary embodiment of the outlet valve is characterized in that the main valve spring as a flat leaf spring is made of spring steel. In the closed state of the outlet valve, the main valve spring lies tightly against the outlet opening and closes this.

A further preferred exemplary embodiment of the outlet valve is characterized in that the main valve spring has a smaller thickness than the additional valve spring. The main valve spring has for example a thickness of 0.15 to 0.2 millimeters. This thickness range has proved particularly advantageous in experiments performed in the context of the present invention.

A further preferred exemplary embodiment of the outlet valve is characterized in that the additional valve spring has a curved form. In closed state of the outlet valve, the additional valve spring does not lie against the main valve spring. Advantageously, the additional valve spring lies against the main valve spring only at its end which is clamped together with the main valve spring. Starting from the clamping point, the additional valve spring is bent away from the main valve spring.

A further preferred exemplary embodiment of the outlet valve is characterized in that the additional valve spring has an elliptically curved form. The design of the additional valve spring curving elliptically away from the main valve spring has proved particularly advantageous in experiments performed in the context of the present invention.

A further preferred exemplary embodiment of the outlet valve is characterized in that the additional valve spring is made of spring steel. The additional valve spring may be made of the same or a similar material as the main valve spring. In this way the manufacturing costs of the outlet valve may be reduced.

A further preferred exemplary embodiment of the outlet valve is characterized in that the hold-down element has a curved form. The hold-down element is advantageously bent or curved slightly more strongly than the additional valve spring. This achieves in a simple manner that the additional valve spring together with the main valve spring can move up to the hold-down element in order to create the progressive spring characteristic curve of the outlet valve.

A further preferred exemplary embodiment of the outlet valve is characterized in that the hold-down element has an elliptically curved form. The elliptically curved form of the hold-down element has proved particularly advantageous in experiments performed in the context of the present invention. The design of the hold-down element may for example correspond substantially to that of a bend line of a flexion boom clamped on one side, i.e. a cantilever arm.

A further preferred exemplary embodiment of the outlet valve is characterized in that the hold-down element is made of steel. The hold-down element is preferably made from a relatively soft steel because it need only fulfill a slight spring function and this is more favorable for procurement.

A further preferred exemplary embodiment of the outlet valve is characterized in that the hold-down element has a greater thickness than the additional valve spring. The hold-down element for example has a thickness of 1.5 to 2.0 millimeters. This thickness range has proved particularly advantageous in experiments performed in the context of the present invention.

The invention furthermore concerns a vacuum pump with an outlet opening and an outlet valve as described above. The vacuum pump is for example a vacuum pump as disclosed in international publications WO 2009/018906 A1 and WO 2010/145633 A2. Vacuum pumps are used in motor vehicles for example to create a vacuum in a brake servo. The two springs and the hold-down element preferably have substantially the same form in top view. The main valve spring in any case is sufficiently large for it to be able to close the outlet opening reliably. The additional valve spring, apart from its curved design, preferably has the same form in top view as the main valve spring.

Further advantages, features and details of the invention arise from the description below in which various exemplary embodiments are described in detail with reference to the drawing.

DESCRIPTION OF THE DRAWING

The only attached FIGURE shows an outlet opening of a vacuum pump with an outlet valve according to the invention in cross-section view.

DETAILED DESCRIPTION

In the attached FIGURE, a small part of a vacuum pump 1 with a housing 3 is shown in cross-section. A rotor (not shown) is arranged rotatably in the housing 3. At least one vane (also not shown) is guided movably in or on the rotor. The rotor closely follows with its outer contour, in a so-called flush gap, an inner contour of the housing 3.

The vanes create a suction chamber and a pressure chamber, and vice versa, in a working chamber of the vacuum pump 1 in the housing 3 during rotation. The suction chamber is connected to a suction port via which a medium, in particular air for example from a brake servo, is drawn into the working chamber and delivered via an outlet opening 4.

The medium pressurized in the working chamber during rotation passes through the outlet opening 4 into the environment of the vacuum pump 1 where atmospheric pressure predominates. During normal operation of the vacuum pump 1, normally air with oil particles contained therein is expelled from the pressure chamber through the outlet opening 4.

In order to reduce the power consumption of the vacuum pump 1, the outlet opening 4 is part of an outlet valve 10 configured as a check valve, which prevents a back flow of air from the environment into the pressure chamber as long as the pressure in the pressure chamber is lower than the ambient pressure.

Extreme conditions are decisive for the dimensioning of the outlet opening 4, in particular a relatively high internal pressure on cold start of the vacuum pump 1, since the oil contained in the air has a relatively high viscosity in cold state. Furthermore, in particular on cold start but also at high rotation speeds, pressure peaks can occur with significantly increased pressure values. In order to keep the maximum pressures occurring in the vacuum pump 1 as low as possible, the outlet opening 4 must be designed correspondingly large.

The outlet valve 10 according to the invention comprises a main valve spring 11, an additional valve spring 12 and a hold-down element 15. The main valve spring 11, additional valve spring 12 and hold-down element 15 are configured and arranged so that together they create a progressive spring characteristic curve.

The main valve spring 11, the additional valve spring 12 and the hold-down element 15 are attached at one end to the housing 3 by means of a fixing screw 20. For this purpose, the main valve spring 11, the additional valve spring 12 and the hold-down element 15 each have a passage hole. The fixing screw 20 extends through the passage holes.

The fixing screw 20 firmly clamps the main valve spring 11, the additional valve spring 12 and the hold-down element 15 at one end. The opposite ends 21, 22, 25 of the main valve spring 11, the additional valve spring 12 and the hold-down element 15 are not clamped or attached to the housing 3 and are therefore called free ends.

The main valve spring 11 is configured as a flat leaf spring and in the closed state of the outlet valve 10 shown lies against the outlet opening 4 so that the outlet opening 4 is closed by the main valve spring 11. In the closed state of the outlet valve 10 shown, the additional valve spring 12 is spaced with its free end 22 from the free end 21 of the main valve spring 11.

The additional valve spring 12 is formed elliptically curved or bent. The hold-down element 15 is also formed elliptically curved or bent. The hold-down element 15 is curved or bent slightly more strongly than the additional valve spring 12.

The main valve spring 11 formed as a flat leaf spring is made of spring steel and has a thickness for example of 0.15 to 0.2 millimeters. The spring steel from which the main valve spring 11 is formed is for example a corrosion-resistant material, in particular a chromium nickel alloy steel.

The elliptically curved additional valve spring 12 is also made of spring steel and has a thickness for example of 0.5 to 0.8 millimeters. The spring steel from which the additional valve spring 12 is formed is for example a corrosion-resistant material.

The elliptically curved hold-down element 15 is made from a relatively soft steel and has a thickness for example of 1.5 to 2.0 millimeters.

The elliptical form of the curved additional valve spring 12 and the curved hold-down element 15 advantageously on opening creates a pretension, which increases with amplitude, of the main valve spring 11 formed as a flat leaf spring. This results in an advantageous stabilization of the spring kinematic.

At the same time, the elliptical form of the hold-down element 15 and the additional valve spring 12 prevents an undesirably hard stop of the free end 21 of the main valve spring 11 and/or the additional valve spring 12 on the hold-down element 15. The design of the outlet valve 10 according to the invention allows, in a simple fashion, reliable operation of the vacuum pump 1 both under normal conditions and also on cold start.

LIST OF REFERENCE NUMERALS

1 Vacuum pump
3 Housing
4 Outlet opening
10 Outlet valve
11 Main valve spring
12 Additional valve spring
15 Hold-down element
20 Fixing screw
21 Free end
22 Free end
25 Free end

The invention claimed is:

1. An outlet valve for a vacuum pump comprising:
a main valve spring which, in a closed state of the outlet valve, closes at least one outlet opening from which the main valve spring lifts off on opening of the outlet valve;
a hold-down element which forms a stop for the main valve spring on opening; and
at least one additional valve spring arranged between the main valve spring and the hold-down element, wherein in the closed state of the outlet valve the additional valve spring is partly spaced from the main valve spring in the opening direction such that a free end of the additional valve spring is spaced from the main valve spring and the hold-down element, and wherein the additional valve spring has a length substantially the same as the hold-down element and the main valve spring.

2. The outlet valve as claimed in claim 1, wherein the main valve spring, the additional valve spring and the hold-down element are firmly clamped together at their ends remote from the free end of the additional valve spring.

3. The outlet valve as claimed in claim 1, wherein the outlet valve with the main valve spring and the additional valve spring has an exponentially increasing, progressive spring characteristic curve.

4. The outlet valve as claimed in claim 1, wherein the main valve spring is a flat leaf spring made of spring steel.

5. The outlet valve as claimed in claim 1, wherein the additional valve spring has a curved form with a convex surface facing the main spring valve.

6. The outlet valve as claimed in claim 5, wherein the additional valve spring has an elliptically curved form.

7. The outlet valve as claimed in claim 1, wherein the additional valve spring is made of spring steel.

8. The outlet valve as claimed in claim 6, wherein the hold-down element has a curved form with a convex surface facing the additional valve spring.

9. The outlet valve as claimed in claim 8, wherein the hold-down element has an elliptically curved form.

10. The outlet valve as claimed in claim 1, wherein the hold-down element is made of steel.

11. The outlet valve as claimed in claim 1, wherein the hold-down element has a greater thickness than the additional valve spring.

12. An outlet valve for use in a vacuum pump having a housing defining at least one outlet opening, comprising:
a main valve spring operable in a closed position to close the at least one outlet opening and define a closed state for the outlet valve and in an open position to open the at least one outlet opening and define an open state for the outlet valve;
a hold-down element which forms a stop for the main valve spring when located in its open position; and
an additional valve spring arranged between the main valve spring and the hold-down element, wherein in the closed state of the outlet valve, a free end of the additional valve spring is spaced from the main valve spring and the hold-down element.

13. The outlet valve of claim 12, wherein the outlet valve with the main valve spring and the additional valve spring has an exponentially increasing, progressive spring characteristic curve.

14. The outlet valve of claim 12, wherein an opposite end of each of the main valve spring, the additional valve spring and the hold-down element is secured to the housing.

15. The outlet valve of claim 12, wherein the main valve spring is a flat leaf spring made of spring steel, and wherein the additional valve spring is a curved leaf spring made of spring steel having a convex surface facing the main valve spring.

16. The outlet valve of claim 15 wherein the hold-down element has a curved form having a convex surface facing the additional valve spring and is made of steel, and wherein the hold-down element has a greater thickness than the additional valve spring.

17. A vacuum pump comprising:
a housing defining at least one outlet opening; and
an outlet valve including a main valve spring operable in a closed position to close the at least one outlet opening and define a closed state for the outlet valve and in an open position to open the at least one outlet opening and define an open state for the outlet valve, a hold-down element which forms a stop for the main valve spring when operating in its open state, and an additional valve spring arranged between the main valve spring and the hold-down element, wherein in the closed state of the outlet valve, the additional valve spring is spaced from the main valve spring and the hold-down element.

\* \* \* \* \*